(12) United States Patent
Funaki

(10) Patent No.: US 7,495,164 B2
(45) Date of Patent: Feb. 24, 2009

(54) AID FOR COMPOSING WORDS OF SONG

(75) Inventor: Tomoyuki Funaki, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 956 days.

(21) Appl. No.: 10/734,915

(22) Filed: Dec. 12, 2003

(65) Prior Publication Data
US 2004/0123724 A1    Jul. 1, 2004

Related U.S. Application Data

(62) Division of application No. 09/841,211, filed on Apr. 24, 2001, now Pat. No. 6,689,946.

(30) Foreign Application Priority Data

Apr. 25, 2000  (JP)  ............................. 2000-123965

(51) Int. Cl.
  *G04B 13/00*  (2006.01)
  *G10H 7/00*  (2006.01)
(52) U.S. Cl. ............................. 84/609; 84/600; 84/601; 84/615; 84/649; 84/653
(58) Field of Classification Search ........................ None
  See application file for complete search history.

(56) References Cited

U.S. PATENT DOCUMENTS

| 4,596,032 | A |   | 6/1986 | Sakurai |
| 6,154,720 | A | * | 11/2000 | Onishi et al. .................... 704/2 |
| 6,188,010 | B1 |   | 2/2001 | Iwamura |
| 6,307,139 | B1 |   | 10/2001 | Iwamura |
| 6,449,661 | B1 |   | 9/2002 | Fujishima |
| 6,472,591 | B2 |   | 10/2002 | Aoki et al. |
| 6,538,187 | B2 | * | 3/2003 | Beigi ........................... 84/475 |
| 2003/0167260 | A1 | * | 9/2003 | Nakamura et al. ............. 707/3 |
| 2004/0133559 | A1 | * | 7/2004 | DeVorzon et al. ............... 707/3 |
| 2006/0095852 | A1 | * | 5/2006 | Trepess et al. ............... 715/741 |

FOREIGN PATENT DOCUMENTS

| JP | 63-241595 | 10/1988 |
| JP | 6149800 | 5/1994 |
| JP | 8193837 | 7/1996 |
| JP | 10-097529 | 4/1998 |
| JP | 10-240278 | 9/1998 |
| JP | 2879939 | 1/1999 |
| JP | 2879940 | 1/1999 |

* cited by examiner

*Primary Examiner*—Marlon T Fletcher
(74) *Attorney, Agent, or Firm*—Morrison & Foerster LLP

(57) ABSTRACT

A piano roll score, a word input/edit area and a word continuous display area are displayed. Note bars corresponding to notes of a melody are displayed on the piano roll score. The word input/edit area is divided into input cells having a length corresponding to a tempo number of each note. A pointer is moved to the input cell and a mouse is left-clicked to display an editor area. A letter(s) or character(s) is input by using a word processor function. The pointer is moved to the input cell and the mouse is right-clicked to display a command select box. A display command is selected from the command select box and input, the display command controlling a display style of a song-word character train in the word continuous display area. A dictionary database is used to search a song word by using the number of syllables and a part of speech as search keys. A sentence syntax is selected by using a sentence syntax template.

12 Claims, 15 Drawing Sheets

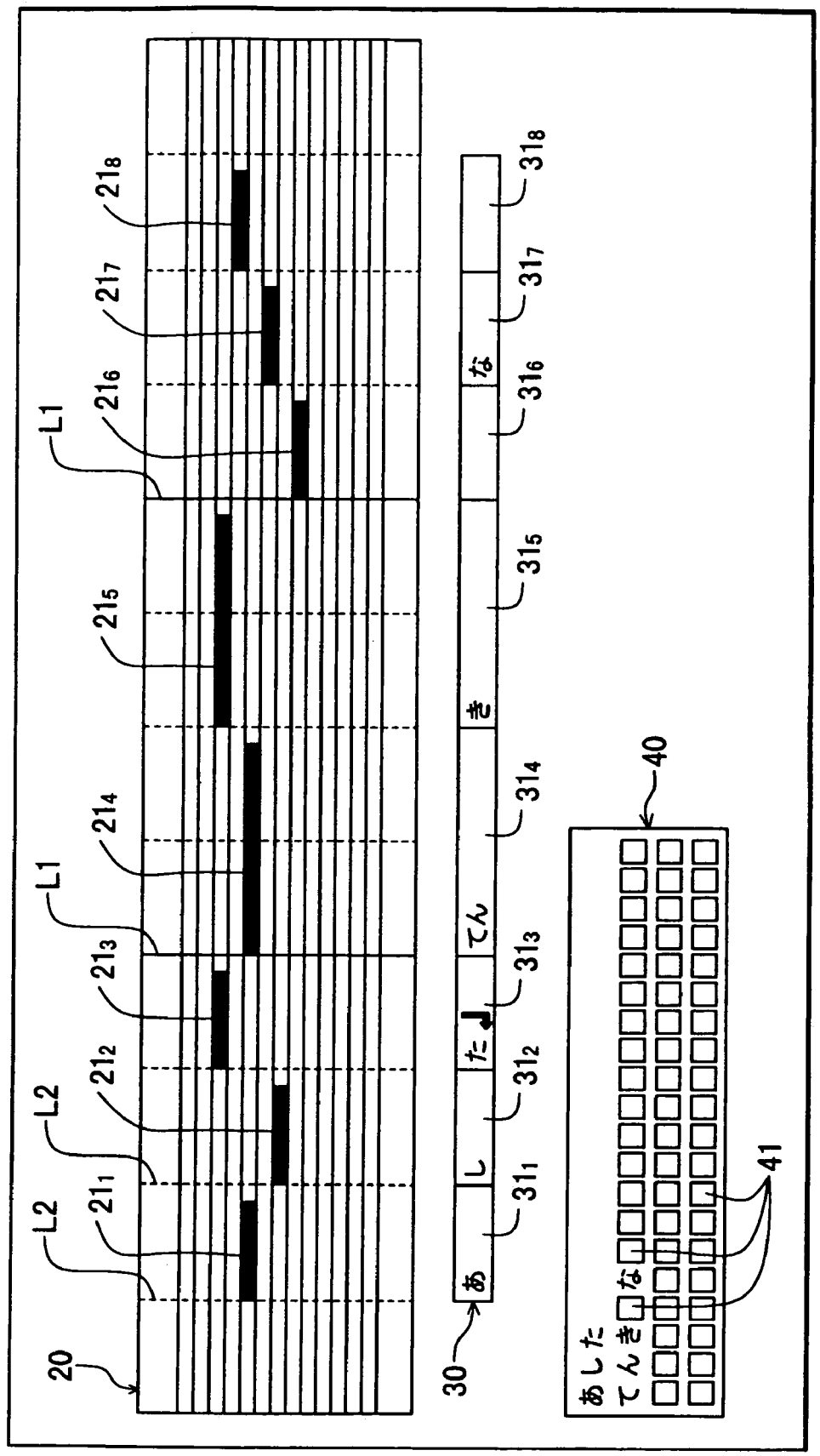

LEFT CLICK

RIGHT CLICK

FIG.9

| DICTIONARY | |
|---|---|
| WORD | PART OF SPEECH |
| act<br>action<br>ah<br>...<br>beautiful<br>beauty<br>: | n  v<br>n<br>int<br>...<br>a<br>n<br>: |
| アーチ<br>あい<br>あいきどう<br>...<br>いしゃ<br>いか<br>いもほり<br>...<br>かあさん<br>かんたん<br>... | 名詞<br>名詞<br>名詞<br>...<br>名詞<br>名詞<br>名詞<br>...<br>名詞<br>形容動詞<br>... |

FIG.11

| WORD | CANDIDATES |
|---|---|
| ac·cess<br>ac·cord<br>ac·count<br>⋮<br>⋮ | |
| アーチ<br>あい<br>いしゃ<br>イカ<br>かあさん | 門 …<br>愛、愛情 …<br>医者、医師。…<br>海に住む生物 …<br>母親。… |

FIG.12

| WORD 言葉 | PART 品詞 | # of syllables 音数 |
|---|---|---|
| act | n | 1 |
| action | n | 2 |
| ah | int | 1 |
| ⋮ | ⋮ | ⋮ |
| beautiful | a | 3 |
| beauty | n | 2 |
| ⋮ | ⋮ | ⋮ |
| アーチ | 名詞 | 1,2 |
| あい | 名詞 | 1 |
| あいきどう | 名詞 | 4,5 |
| … | … | … |
| いしゃ | 名詞 | 2 |
| いか | 名詞 | 2 |
| いもほり | 名詞 | 2 |
| … | … | … |
| かあさん | 名詞 | 2,3,4 |
| かんたん | 形容動詞 | 2,3 |
| … | … | 4 … |

| VOCABULARY DATA BASE | |
|---|---|
| glob・al<br>glo・ry<br>glow・ing<br>⋮ | a<br>a<br>a<br>⋮ |
| あかい<br>あめ<br>つくえ<br>はやい<br>おだやかな<br>すばらしい<br>はな<br>きっと<br>ああ<br>あるく<br>流す<br>うつくしい<br>うた<br>…… | 形容詞<br>名詞<br>名詞<br>形容詞<br>形容動詞<br>形容詞<br>名詞<br>副詞<br>感嘆詞<br>自動詞<br>他動詞<br>形容詞<br>名詞 |

AID FOR COMPOSING WORDS OF SONG

CROSS-REFERENCE TO RELATED APPLICATION

This application is a division of application Ser. No. 09/841,211, filed on Apr. 24, 2001, which application is specifically incorporated herein, in its entirety, by reference.

This application is based on Japanese Patent Application No. 2000-123965, filed on Apr. 25, 2000, the entire contents of which are incorporated herein by reference.

BACKGROUND OF THE INVENTION a) Field of the Invention

The present invention relates to techniques of aiding a work of composing words of a song.

b) Description of the Related Art

As a conventional word composing apparatus, a word composition aiding apparatus is known which is disclosed in JP-A-10-97529. This apparatus divides music into a plurality of paragraphs, sets a word composing condition to each paragraph, derives words matching the word composing condition from a "poem piece data bank" to present them to a user, and stores the word selected by the user to compose words. The apparatus also detects the number of syllables of a given melody so that words matching the number of syllables are derived from the "poem piece data bank".

With this conventional apparatus, a correspondence between each note of a given melody and a character of song words is not so easy to be understood. In deriving words matching the number of syllables of a melody, it is desired to consider a "phonetic sound" of each character to derive more general song words. For example, a word "かん" is pronounced either as two notes of "か" and "ん" or as a single note of "かん". If words having the number of characters equal to the number of syllables are derived, only the words corresponding to the two tones in this example are derived and words corresponding to one tone cannot be derived.

It is very difficult for a songwriter novice to understand what part of speech is placed at which position to compose good song words. It is effective for aiding a songwriter in such a point.

SUMMARY OF THE INVENTION

It is an object of the present invention to provide techniques of providing an effective aid in composing song words matching a melody.

According to one aspect of the present invention, there is provided a word composing apparatus comprising: a melody display controller for visually displaying a given melody on a display connected to the word composing apparatus; an input cell display controller for displaying an input cell corresponding to each note of the melody on the display; and an input processor for executing a process of inputting letters or characters of a song word corresponding to a note to the input cell.

A continuous character display controller may be provided which displays a continuous character train in a continuous display area of the display, wherein characters input to the input cells are displayed in the continuous display area as a continuous song word character train.

A continuous character train includes a train of long song words displayed in rows and a train containing spaces intentionally inserted. The continuous character train has continuous characters in at least two adjacent input cells.

According to another aspect of the present invention, there is provided a word composing apparatus comprising: a dictionary storing at least words and parts of speech corresponding to the words; a search condition designator for designating at least a part of speech as a search condition; a word search unit for searching a word matching the search condition designated by the search condition designator from the dictionary; a search result display unit for displaying a searched word; and an input processor unit for executing a process of inputting a word displayed on the search result display unit as letters or characters of a song word.

According to various features of the invention, the following advantages can be obtained:

a relation between each note of a melody, a character of song words, and a syllable can be easily understood;

continuous words separated in respective input cells can be displayed as a continuous character train or syllable train;

words of a continuous character train or syllable train can be made easy to look;

input cells still not input with song word characters or syllables can be found easily;

a word can be selected by designating a part of speech;

a word can be selected by designating the number of syllables and a part of speech;

a plurality of characters or syllables can be made to have a correspondence to one note;

an order of parts of speech can be determined simply by selecting a sentence syntax template;

each section of melody can be made easy to have a correspondence to a part of speech; and an effective aid in composing words matching a melody can be provided.

BRIEF DESCRIPTION OF THE DRAWINGS

FIGS. 1A and 1B are plan views showing examples of a word composing screen according to a first embodiment of the invention.

FIG. 9 is a table showing an example of the contents of a dictionary according to the second embodiment.

FIG. 11 is a diagram showing an example of search results in a search result list box according to the second embodiment.

FIG. 12 is a table showing another example of a dictionary according to the second embodiment.

FIG. 14 is a diagram showing an example of a sentence syntax template database according to the third embodiment.

FIG. 15 is a table showing an example of a vocabulary database according to the third embodiment.

DETAILED DESCRIPTION OF THE PREFERRED EMBODIMENTS

Embodiments of the invention will be described with reference to the accompanying drawings.

Figure 5:
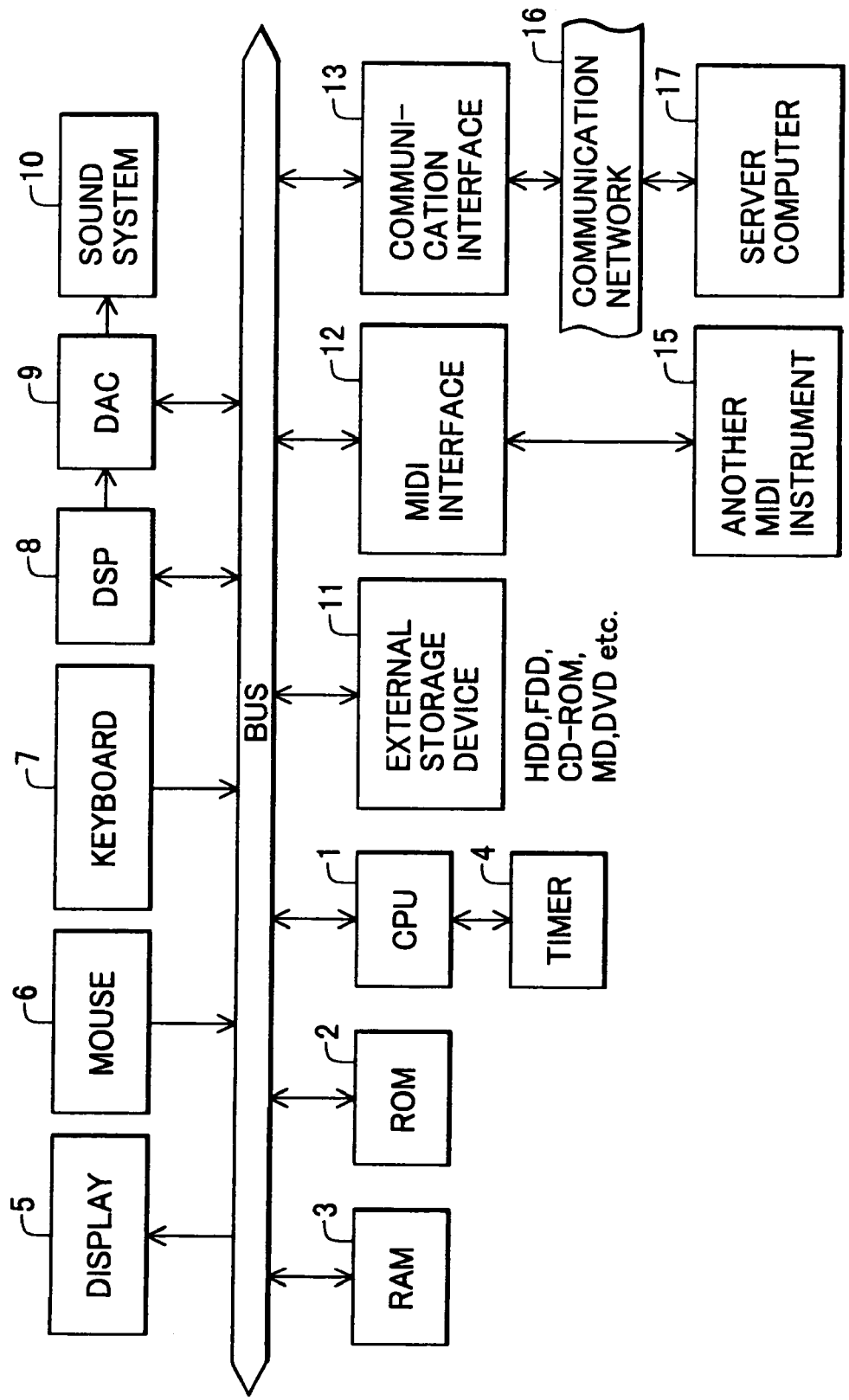
FIG. 5 is a block diagram of the word composing apparatus utilizing a personal computer and software according to an embodiment of the invention.

FIG. 5 is a block diagram showing the structure of a word composing apparatus constituted of a personal computer and software according to an embodiment of the invention. The personal computer has a CPU 1, a ROM 2, a RAM 3, a timer 4, a display 5, a mouse 6, a keyboard 7, a digital signal processor (DSP) 8, a D/A converter (DAC) 9, a sound system 10, an external storage device 11, a MIDI interface 12, a communication interface 13 and a bus 14. DSP 8, DAC 9 and MIDI interface 12 are mounted on a sound card or the like. The display 5, mouse 6, keyboard 7 and external storage device 11 have interfaces.

CPU 1 runs on an operating system (OS) installed, for example, in a hard disk drive (HDD) of the external storage device 11 by using a working area of RAM 3 to execute a normal control operation. Specifically, CPU 1 executes a display control of the display 5, inputs data in response to an operation of the mouse 6 and keyboard 7, controls the display position of the mouse pointer on the display 5, and detects a click operation of the mouse 6. In this manner, an input setting operation by a user can be performed by a so-called graphical user interface (GUI) process with the display screen of the display 5 and the operation of the mouse 6.

When melody data is reproduced, CPU 1 executes an interrupt process in response to an interrupt signal from the timer 4 to reproduce tone data in the melody data or supply data of each performance to a tone generator in DSP 8. DSP 8 generates digital musical tone signals corresponding to the data supplied from CPU 1 and supplies them to DAC 9. DAC 9 converts the digital musical tone signal into an analog audio signal which is supplied to the sound system 10 including an amplifier, a speaker and the like to generate musical sounds.

The external storage device 11 may be one or a plurality of devices including a hard disk drive (HDD), a floppy disk drive (FDD), a CD-ROM drive, a magneto optical (MO) disc drive, a digital versatile disk (DVD) drive. For example, the external storage device 11 supplies CPU 1 with melody data and a word composing program. The external storage device 11 is also used for storing composed word data and databases for dictionaries and sentence syntax templates. The MIDI interface 12 transfers various data to and from another MIDI instrument 15. For example, the MIDI interface 12 receives melody data supplied from the MIDI instrument 15 and outputs composed word data to the MIDI instrument 15.

The word composing apparatus can be connected via the communication interface 13 to a communication network 16 such as a local area network (LAN), the Internet and a telephone line so that it can receive from a server computer 17 various data such as a word composing program, melody data, dictionary data, and sentence syntax template data. For example, the data including the word composing program, melody data, dictionary data, and sentence syntax template data is stored in the hard disk drive (HDD) of the external storage device 11. CPU 1 develops the word composing program stored in the hard disk drive (HDD) upon RAM 3 and executes the program in RAM 3 to control a word composing process.

1st Embodiment

Figure 2:
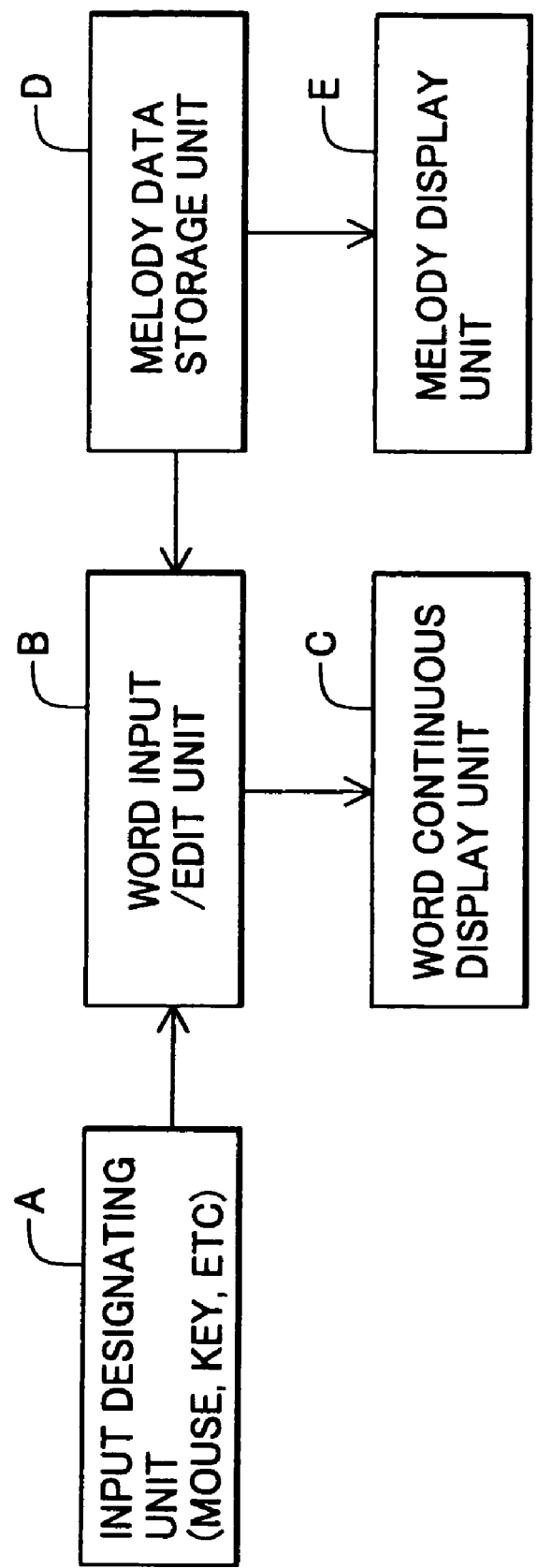
FIG. 2 is a block diagram showing the main part of the word composing apparatus of the first embodiment.

FIG. 2 is a block diagram showing the main part of the word composing apparatus according to the first embodiment. An input designating unit A includes the mouse 6 and keyboard 7. A word input/edit unit B includes an input area set on the display 5, a graphic RAM and the like. A word continuous display unit C includes a display area set on the display 5, a graphic RAM and the like. A melody data storage unit D includes RAM 3 or the external storage device 11 for storing melody data for which words are composed. A melody display unit E includes a display area set on the display 5, a graphic RAM and the like. The display 5 may be an external display.

A process at each unit is executed by running CPU 1 on the word composing program. In accordance with the melody data stored in the melody data storage unit D, a melody is visually displayed on the melody display unit E. Specifically, note bars are displayed on a piano roll score as note display elements. In accordance with the melody data stored in the melody data storage unit D, the word input/edit unit B is displayed by separating it into input cells corresponding to respective notes. When the input designating unit A inputs each character to the word input/edit unit B, characters input from the word input/edit unit B are displayed as a continuous character train on the word continuous display unit C.

Figure 1A:
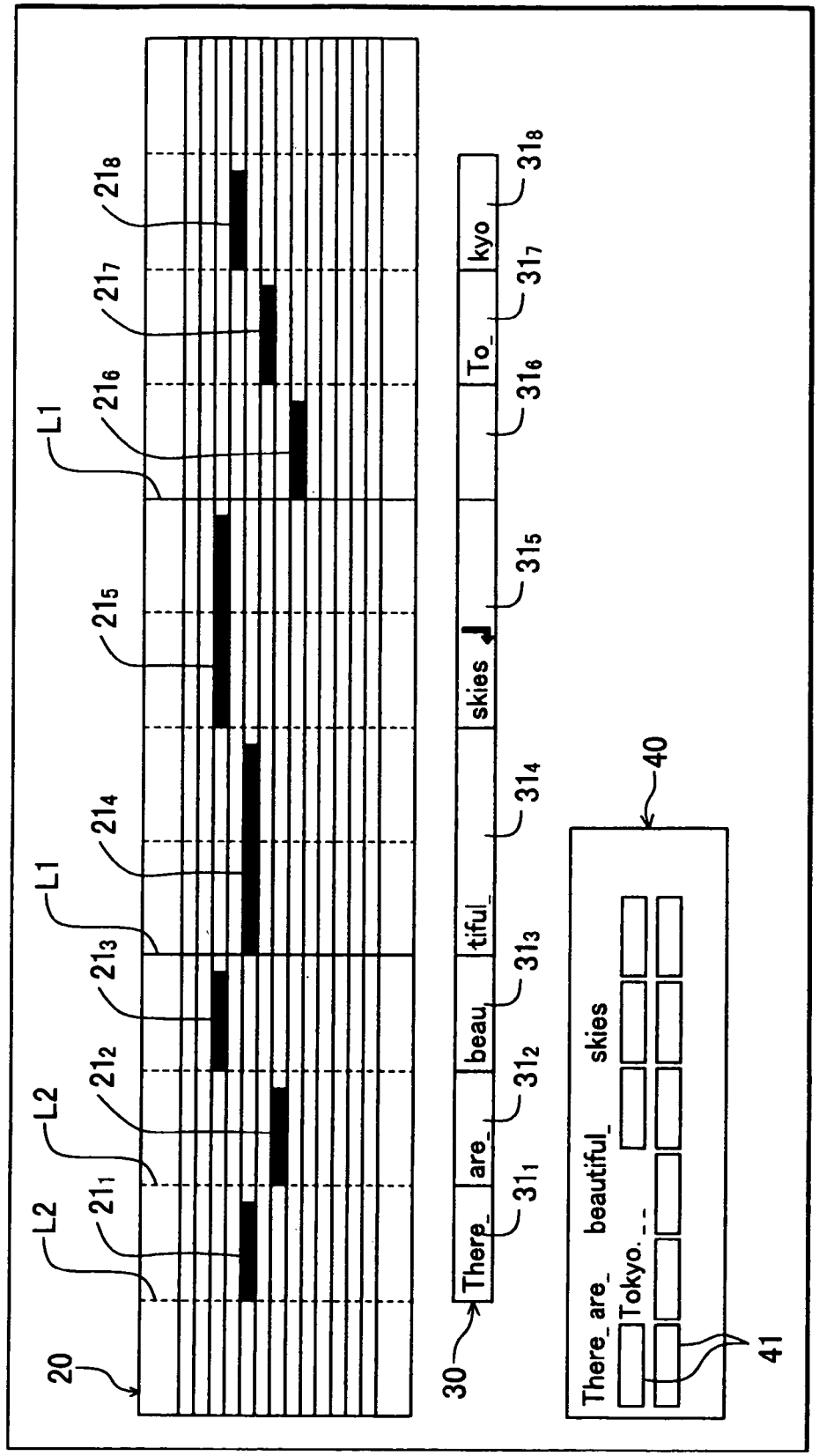

FIGS. 1A and 1B are diagrams showing examples of a word composing display screen of the display 5. FIG. 1A shows English song words, and FIG. 1B shows Japanese song words. On this word composing display screen, a piano roll score 20 corresponding to the melody display unit E, a word input/edit area 30 corresponding to the word input/edit unit B, and a word continuous display area 40 corresponding to the word continuous display unit C are displayed. The piano roll score 20 has a laterally elongated area divided in an up/down direction to simulate a piano keyboard. Each area divided in the up/down direction corresponds to the pitch of each key of the piano, the lower area being a lower pitch key and the higher area being a higher pitch key. The horizontal direction from the left to right corresponds to a time lapse direction. A measure line L1 is displayed to partition each measure in the time lapse direction. A tempo line L2 is displayed corresponding to a tempo position. Note bars $21_1$, $21_2$, ..., $21_8$ corresponding to notes are displayed as note display elements of the melody. The suffix of the reference numeral is used for distinguishing between a plurality of same elements. In the following description, if the elements are not necessary to be distinguished, the suffix is omitted. The note bar 21 indicates a location (time position) along the right/left direction on the screen, and the length of the note bar 21 indicates a gate time (reproduction continuation time) of the note. In this example, a four-four time is used, other times may also be used.

The word input/edit area 30 is displayed just under the piano roll score 20 and is divided into input cells $31_1$, $31_2$, ..., $31_8$ each having the length corresponding to a tempo number of each note bar 21. The length of the note bar 21 corresponds to the gate time. Therefore, for example, a quarter note does not have one tempo length (a distance between tempo lines L2). Each input cell 31 has a length corresponding to the length of a corresponding note in accordance with the location of each note bar 21. For example, in FIGS. 1A and 1B, the note bars $21_1$, $21_2$, $21_3$, $21_6$, $21_7$ and $21_8$ are quarter notes and the corresponding input cells $31_1$, $31_2$, $31_3$, $31_6$, $31_7$ and $31_8$ have a one-tempo length, whereas the note bars $21_4$ and $21_5$ are half notes and the corresponding input cells $31_4$ and $31_5$ have a two-tempo length. The length of each input cell may be set to the gate time (length of the note bar).

Each input cell 31 is input with a syllable(s) or character(s), or a command (hereinafter called a "display control command") for controlling a display style of words or a song word character train.

In the example shown in FIG. 1A, "There" is input to the input cell $31_1$, "are" is input to the input cell $31_2$, "beau" is input to the input cell $31_3$, "tiful" is input to the input cell $31_4$, "skies and an enter (return) code" are input to the input cell $31_5$, "To" is input to the input cell $31_7$, and "kyo" is input to the input cell $31_8$. The input cell $31_6$ is still not input.

The word continuous display area 40 is displayed under the word input/edit area 30 and displays a continuous syllable train in a plurality of rows and columns. In the example shown in FIG. 1A, a character or letter train "There are beautiful skies" is displayed in the first row, the train having continuous syllables in the input cells $31_1$ to $31_5$, and the enter command input to the input cell $31_5$ returns the first row. In the second row, no syllable is input to the input cell $31_6$ so that this input cell is empty, and the syllables "To•kyo" in the input cells $31_7$ and $31_8$ are displayed.

For example, since no syllable is input to the input cell $31_6$, a non-input symbol 41 (in the example shown in FIG. 1A, □) is displayed to indicate that no syllable is input. By looking at the word continuous display area 40, it is easy to confirm a presence of an input cell 31 without no input syllable and a corresponding note bar 21. The non-input symbol is not displayed after the position of the enter command as in the first row.

In the example shown in FIG. 1B, "あ" is input to the input cell $31_1$, "し" is input to the input cell $31_2$, "た and an enter (return) command" are input to the input cell $31_3$, "てん" is input to the input cell $31_4$, "き" is input to the input cell $31_5$, "な" is input to the input cell $31_7$. The input cells $31_6$ and $31_8$ are still not input.

The word continuous display area 40 is displayed under the word input/edit area 30 and displays a continuous syllable train in a plurality of rows and columns. In the example shown in FIG. 1B, a character or letter train "あした" is displayed in the first row, the train having continuous syllables "あ", "し" and "た" in the input cells $31_1$ to $31_3$, and the enter command input to the input cell $31_3$ returns the first row. In the second row, a character or letter train "てんき" is displayed, the train having continuous syllables "てん" and "き" in the input cells $31_4$ and $31_5$, and no syllable is input to the input cell $31_6$ so that this input cell is empty, and the syllable "な" in the input cell $31_7$ is displayed.

For example, since no syllable is input to the input cells $31_6$ and $31_8$, a non-input symbol 41 (in the example shown in FIG. 1B, □) is displayed to indicate that no syllable is input. By looking at the word continuous display area 40, it is easy to confirm a presence of an input cell 31 without no input syllable and a corresponding note bar 21. The non-input symbol is not displayed after the position of the enter command as in the first row.

Figure 3:
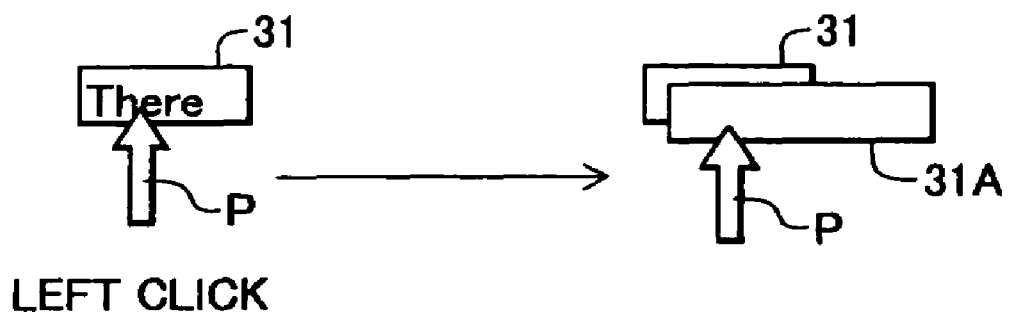
FIG. 3 is a diagram illustrating an input operation of inputting a character or the like in an input cell according to the first embodiment.

FIG. 3 is a diagram illustrating an input operation of inputting a character or the like to the input cell 31. As the pointer P of the mouse is moved to the input cell 31 and the mouse is left-clicked, an editor area 31A for input only is displayed. In this state, a character is input, for example, by using the keyboard 7. This character input process can be realized by well known techniques such as a word processor function (e.g., Japanese language input function) of a personal computer. By opening the editor area 31A and selecting a character or word displayed in a search result list box as in second and third embodiments to be described later, a character or word can be input. By operating an enter (return) key, the editor area 31A disappears and letters or characters (or words) input to the editor area 31A are input to the input cell 31.

Figure 4:
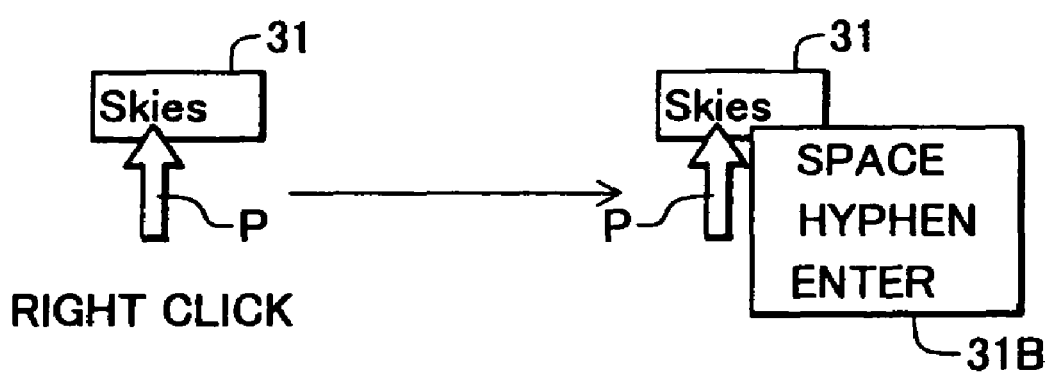
FIG. 4 is a diagram illustrating an input operation of inputting a display control command according to the first embodiment.

FIG. 4 is a diagram illustrating an input operation of inputting a display control command. As the pointer P of the mouse is moved to the input cell 31 and the mouse is right-clicked, a command select box 31B is displayed. In this command select box 31B, the names (space, a center dot delimiting syllables, hyphen, enter and the like) of a display control command are displayed. The display control command is used for controlling the display style, not relevant to sound reproduction, of a song word character train in the word continuous display area (continuous display unit) 40. By using the pointer P of the mouse 6 or the cursor keys of the keyboard 7, a command in the command select box 31B is selected so that the selected command is input to the input cell 31. The letter(s) or character(s) or command data input (established) to the input cell 31 is written in the storage area of RAM 3. In accordance with the stored data, a letter(s) or character(s) is displayed in the word continuous display area 40. Specifically, when the "space" is selected, a space (underline or an empty area without the non-input symbol 41) is inserted in the word continuous display area 40, when the "hyphen" is selected, a hyphen is inserted, and when the "enter" is selected, an enter is inserted.

As the display control command is input, the display style of the word continuous display area 40 is changed. In this case, "_" for the space, "-" for the hyphen and "♪" for the enter may be displayed in the input space as the display control command. The user can confirm such display easily.

Figure 6:
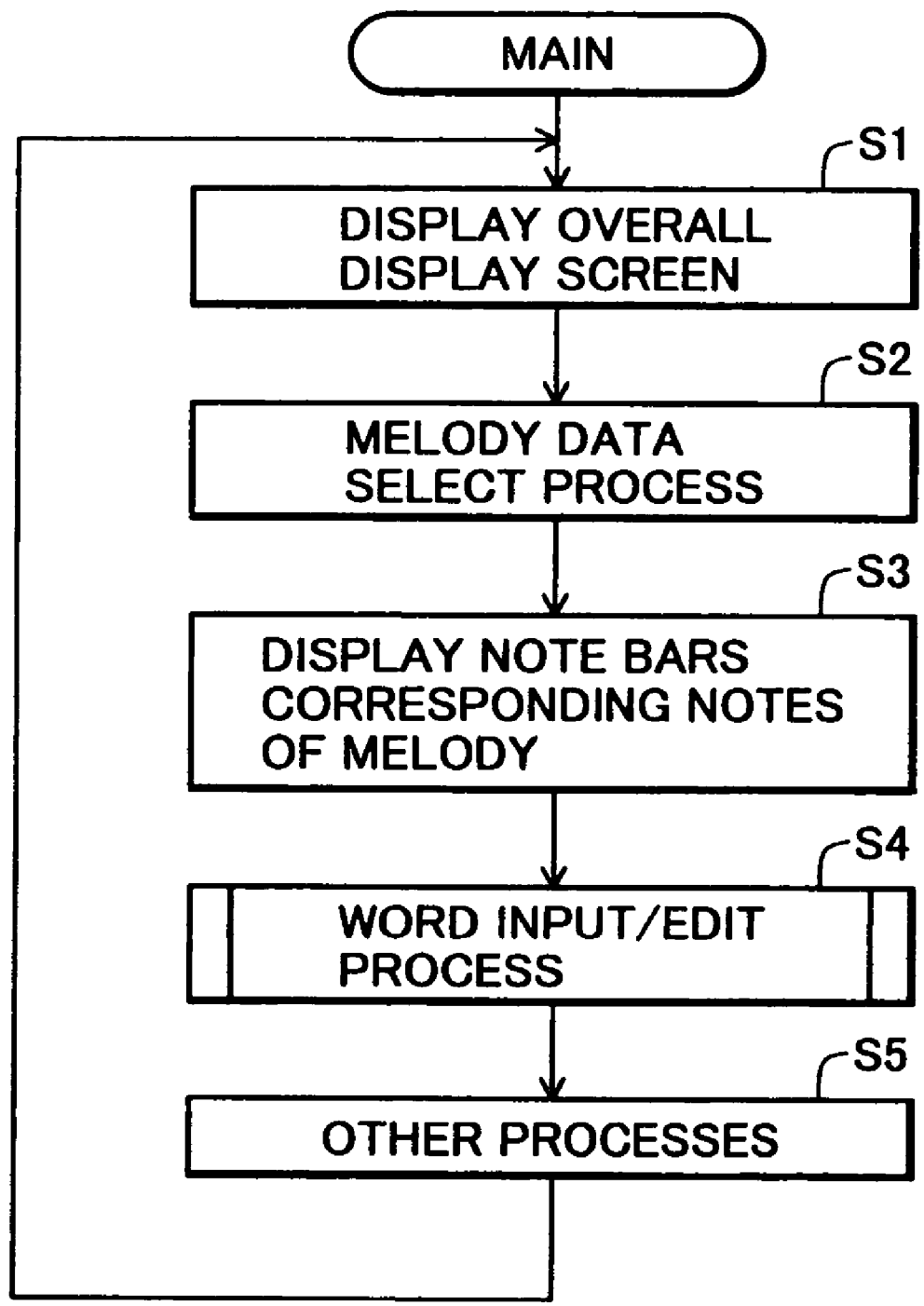
FIG. 6 is a flow chart illustrating a main routine of a word composing program according to the first embodiment.
Figure 7:
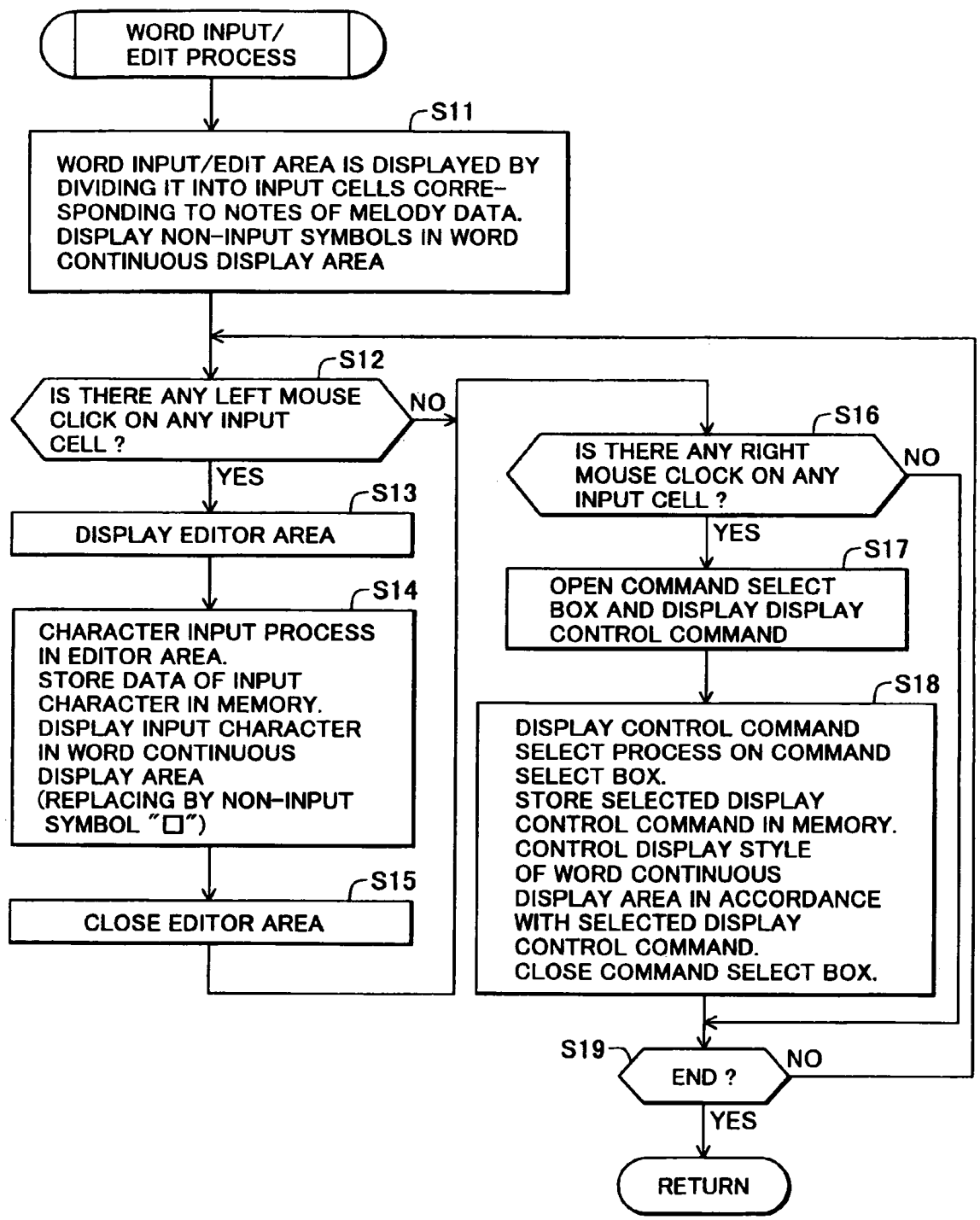
FIG. 7 is a flow chart illustrating a word input/edit process according the first embodiment.

FIG. 6 is a flow chart illustrating a main routine of the word composing program according to the embodiment, and FIG. 7 is a flow chart illustrating a sub-routine of the word input/edit process. The control operation of CPU 1 will be described with reference to each flow chart. As the main routine shown in FIG. 6 starts, at Step S1 an overall display screen of the piano roll score 20, word continuous display area 40 and the like are displayed (the word input/edit area 30 is displayed later). At Step S2 a user designates a melody select process including a step of reading melody data from the hard disk drive or the like of the external storage device 11. Next, at Step S3, note bars 21 corresponding to the notes of the selected melody are displayed on the piano roll score 20. At Step S4, the word input/edit process shown in FIG. 7 is executed. At Step S5 other processes are executed to thereafter return to Step S1. The other processes include a process of saving the composed words.

In the word input/edit process shown in FIG. 7, at Step S11 in accordance with the selected melody data, the word input/edit area 30 is displayed by dividing it into input cells 31 corresponding to the notes of the melody, and the non-input symbol ("□") 41 is displayed in each row and column of the word input/edit display area 40. Next, at Step S12 it is checked whether there is a left click operation of the mouse on any input cell 31. If there is no left click operation, the flow branches to Step S16, whereas if there is a left click operation, the flow advances to Step S13. At Step S13 the editor area 31A is displayed. Next, at Step S14 an input operation of inputting a letter(s) or character(s) is performed in the editor area 31A, and data of the input letter(s) or character(s) is stored in the memory (e.g., RAM 3) and the input letter(s) or character(s) is displayed in the word continuous display area 40. Namely, the input letter(s) or character(s) is displayed by replacing it by the non-input symbol ("□") 41. At Step S15 the editor area 31A is closed to follow Step S16. With the above processes, an input process of inputting a letter(s) or character(s) can be performed as described with reference to FIG. 3.

At Step S16 it is checked whether there is a right click operation of the mouse on any input cell 31. If there is no right click operation, the flow skips to Step S19, whereas if there is a right click operation, the flow advances to Step S17. At Step S17 the command select box 31B is opened and displayed. Next, at Step S18 a process of selecting the display control command by the user is executed, the selected display command is stored in the memory (e.g., RAM 3), and in accordance with the selected display control command, the display style of the word continuous display area 40 is controlled to thereafter close the command select box 31B and advance to Step S19. At Step S19 it is checked whether there is a termination instruction of the word input/edit work. If there is a termination instruction, the flow returns to the main routine, whereas if there is no termination instruction, the flow returns to Step S12. With the above processes, an operation of inputting the display control command described with reference to FIG. 4 can be performed.

In the above-described embodiment, when the input cell is to be selected, the pointer P is moved to the input cell and the left click of the mouse is performed. When the succeeding input cell is to be selected, the arrow key (→ or ←) or a TAB key of the keyboard may be used. By operating the enter key or the like in the state that the input cell is selected, the editor area 31A may be opened. Further, although after the input cell is selected and the editor area 31A is opened, a character(s) or display control command is input, the character(s) or display control command may be written directly in the input cell. If the character train becomes long, the input cell may be expanded to two rows.

Also in the above embodiment, although note bars 21 are displayed on the piano roll score 20 to visually display the melody, the melody may be displayed on a staff notation or a TAB score.

2nd Embodiment

Next, the second embodiment will be described. The second embodiment pertains to a function of aiding a user in determining a character(s) or word(s) of song words. A process of inputting a character(s) or word(s) determined by the second embodiment and a process of displaying an input display screen can use the processes of the first embodiment including the process of inputting a character(s) to the input cell and the process of displaying the piano roll score 20, word input/edit area 30 and word continuous display area 40.

Figure 8:
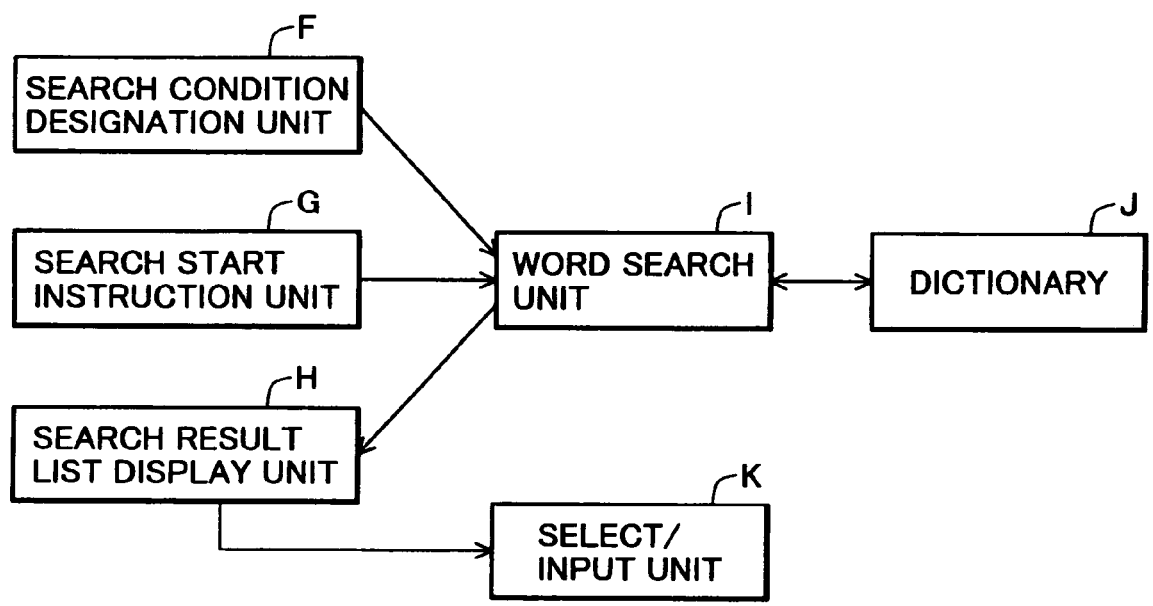
FIG. 8 is a block diagram showing a main part of a second embodiment.

FIG. 8 is a block diagram showing the main part of the second embodiment. A search condition designation unit F and a search start instruction unit G are made of GUI utilizing the mouse 6 or keyboard 7 and a screen of the display 5. A search result list display unit H is a list box or the like displayed on the display 5. A word search unit I is a function obtained while CPU 1 executes the word composing program of the second embodiment of the invention. A dictionary J is a database stored in a hard disk or the like of the external storage device 11. A select/input unit K is, for example, the input cell 31, editor area 31A or the like of the first embodiment.

As shown in FIG. 9, the dictionary J to be searched has a number of sets of a word and a part of speech registered. The part of speech includes a noun, a pronoun, a verb, an auxiliary verb, an adjective, an adverb, a preposition, a conjunction, an interjection, an adjective verb, a participal adjective, a postpositional auxiliary word, and the like.

Figure 10B:
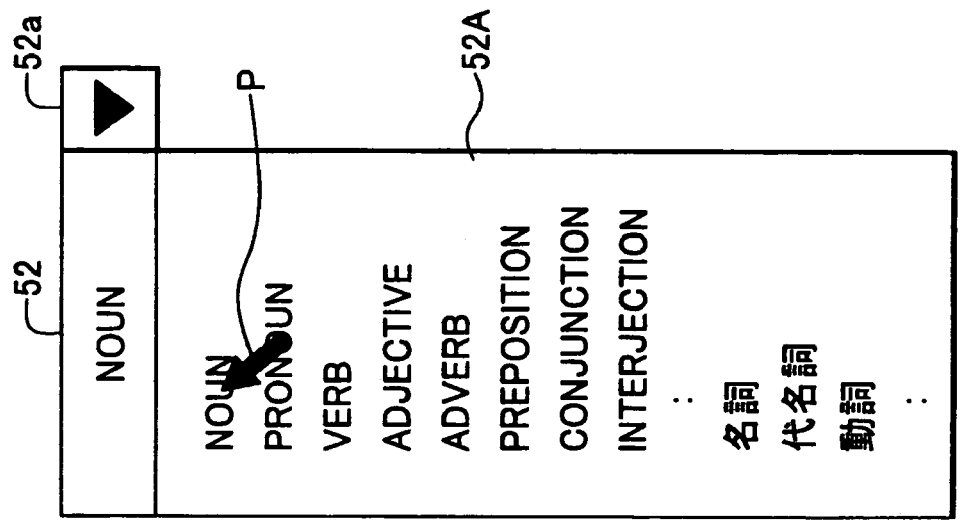
FIGS. 10A and 10B are diagrams showing input display screens corresponding to a search condition designating unit according to the second embodiment.
Figure 10A:
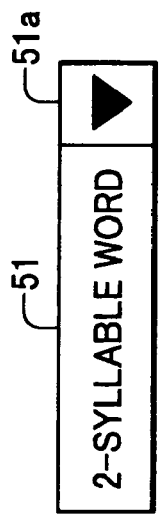

FIGS. 10A and 10B are diagrams showing input display screens corresponding to the search condition designation unit F. The input display screens display an input menu 51 for inputting the number of syllables or sounds and an input menu 52 for inputting a part of speech. The input menus 51 and 52 display the number of syllables and the part of speech presently selected. In the usual case, only the input menus 51 and 52 are displayed. When the pointer P of the mouse 6 is moved to either a pull-down switch 51a or 52a and the mouse is clicked, a select box 52A such as shown in FIG. 10B is displayed. When the pointer P of the mouse 6 is moved to any one of the parts of speech displayed in the select box 52A and the mouse is clicked, or any one of the parts of speech is selected by using an arrow key (↑ or ↓) and the enter key, the selected part of speech is displayed in the input menu 52. Similarly, the pull-down menu for the input menu 51 for inputting the number of syllables displays "one-syllable word, two-syllable word, three-syllable word, . . . ".

As the search condition including the number of syllables and the part of speech is entered by using the search condition designation unit F in the manner described above, the entered search condition is sent to the word search unit I. The search condition may be selected from any one of candidates prepared beforehand or a user may designate and input any word.

Next, when the search start instruction unit G instructs the word search unit I to start a search, the word search unit I sequentially read words registered in the dictionary J, judges whether the read word matches the search condition, and picks up the word matching the search condition. In this pickup process, the number of syllables or sounds of a read word is calculated based upon syllable number count rules to be described later, and it is judged whether the counted number of syllables satisfies the search condition and whether the part of speech of the read word satisfies the search condition. For example, if the search condition is "two-syllable word and noun" as shown in FIGS. 10A and 10B, it is judged whether the read word is a two-syllable word and whether the part of speech field of the read word indicates a noun. In this manner, words of a two-syllable word and a noun are picked up. Other search conditions may also be applied. For example, the characteristics of a word may be used as the search condition, such as "human related words", "animal related words", "nature related words", and "place name related words" for the noun words. If one word can be pronounced in many ways, words capable of being pronounced in many ways are also checked. For words capable of liaison, words with liaison and words without liaison are also checked.

The following five syllable number count rules are know for Japanese words.

1) For a word having a small letter such as "しゃ" and "ちゃ", the small letter is not counted.

2) For a word having "ん" at a position except the start position such as "かん" and "らん", the "ん" is counted in some case and not counted in other cases.

3) For a word having "う" at a position except the start position such as "とう" and "そう", the "う" is counted in some case and not counted in other cases.

4) For a word having "あ" at a position except the start position such as "かあ" and "まあ", the "あ" is counted in some case and not counted in other cases.

5) A prolonged sound "-" in a katakana word is counted in some case and not counted in other cases.

These syllable number count rules are applied in the manner as in the following specific examples.

When a word "いしや" is read, the rule 1) is applied. Since "い" and "しや" are both one syllable, it is judged that the word is a two-syllable word.

When a word "かんたん" is read, the rule 2) is applied. Since "かん" and "たん" are both one syllable or two syllables, it is judged that the word "かんたん" corresponds to each of a two-syllable word, a three-syllable word and a four-syllable word.

When a word "あいきとう" is read, the rule 3) is applied. A word "あいきと" has each one syllable and four syllables in total. Since "う" is counted in some case and not counted in other cases, it is a zero-syllable word or a one-syllable word. Therefore, it is judged that the word "あいきとう" corresponds to each of a four-syllable word and a five-syllable word.

When a word "かあさん" is read, the rules 2) and 4) are applied. A syllable "あ" of "かあ" is one syllable and a syllable "あ" is either zero syllable or one syllable according to the rule 4) so that the whole of "かあ" is one syllable or two syllables. Similar to the explanation of "かんたん", a syllable "さん" is either one syllable or two syllables. Therefore, it is judged that the word "かあさん" corresponds to each of a two-syllable word, a three-syllable word and a four-syllable word.

When a word "ア-チ" is read, the rule 5) is applied. Since "-" is counted in some case and not counted in other cases, it is a zero-syllable word or a one-syllable word. Both "ア" and "チ" are one syllable. Therefore, it is judged that the word "ア-チ" corresponds to each of a two-syllable word and a three-syllable word.

The search result is sent to the search result list display unit H. The search result list display unit H displays a search result list box such as shown in FIG. 11 and displays searched words in this search result list box. An example shown in FIG. 11 corresponds to the examples described above. The words as the search result candidates for the two-syllable word are "ア-チ", "あいや", "いしや", "いか", "かあさん" and "かあさん". Since the word "かあさん" is an adjective verb, the words matching the search condition of "two-syllable word" and "noun" are "ア-チ", "あいや", "いしや", "いか", and "かあさん". In the example shown in FIG. 11, although the meaning of each word is displayed, other terms such as synonyms, metonyms, and antonyms may be displayed. The dictionary J stores these meanings, synonyms, metonyms, antonyms and the like of each word to display them.

In order to select a word from the search result list box shown in FIG. 11, the pointer P is moved to the word and the mouse is clicked, or the word is selected by using the arrow key (↑ or ↓) of the keyboard and the enter key. In this manner, the selected word may be input to the input cell 31 or editor area 31A of the first embodiment.

In this embodiment, the number of syllables of a read word is counted based upon the syllable number count rules. Instead, as shown in a dictionary of FIG. 12, the number of syllables of each word may be calculated in advance based upon the syllable number count rules and stored in the dictionary.

3rd Embodiment

Next, the third embodiment will be described. In the third embodiment, melody is divided into small melody sections. By using a sentence syntax template, each melody section is made to have a correspondence with a segment, and a word to be assigned to each segment is searched. As a process of inputting a selected word and a process of displaying input display screens of the third embodiment, the process of inputting a character to the input cell 31 and a process of displaying the piano roll score 20, word input/edit area 30 and word continuous display area 40 of the first embodiment can be applied.

Figure 13:
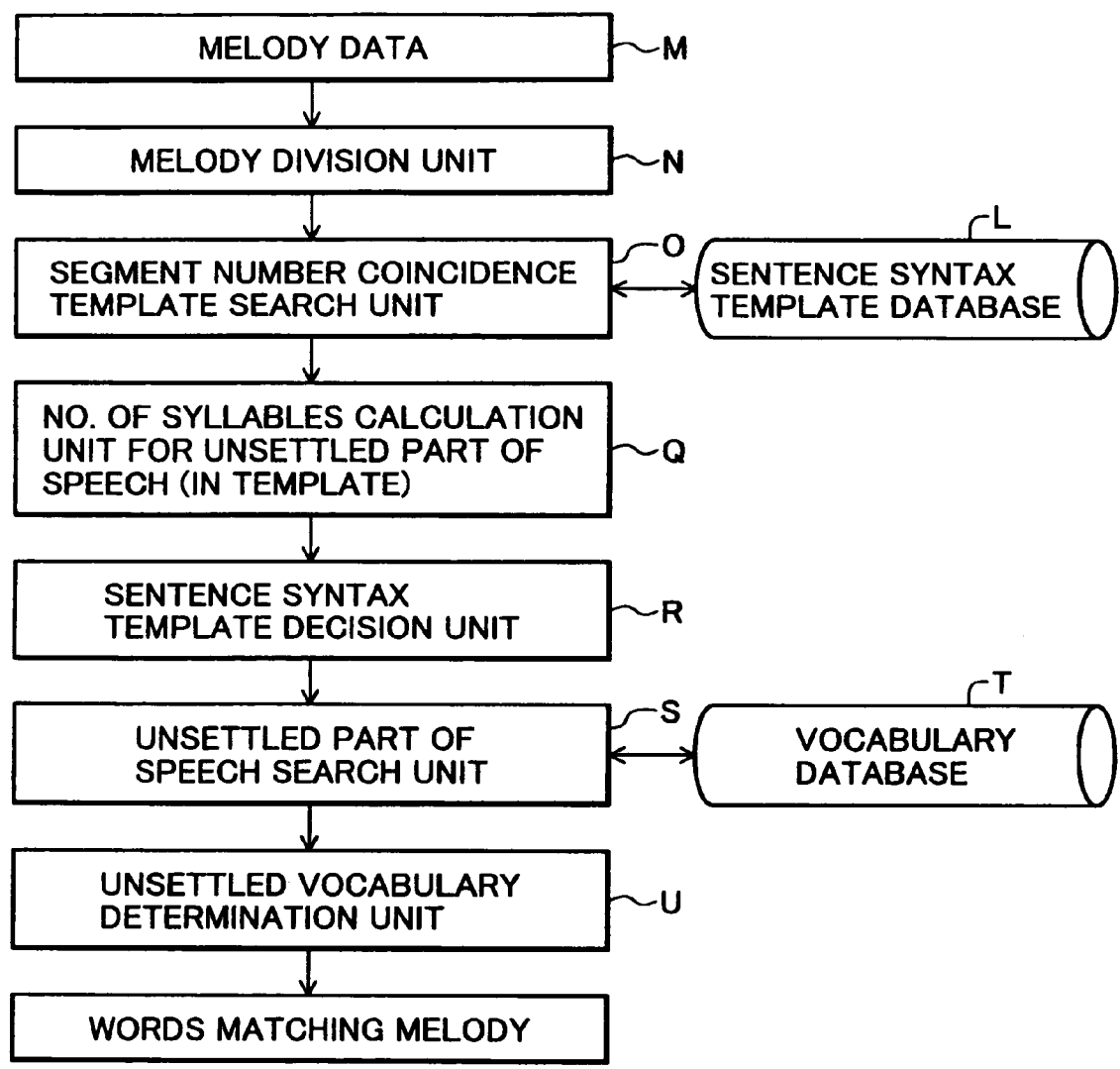
FIG. 13 is a block diagram showing a main part of a third embodiment.

FIG. 13 is a block diagram showing the main part of the third embodiment. A database L for sentence syntax templates is stored in a hard disk drive or the like of the external storage device 11.

Figure 14:
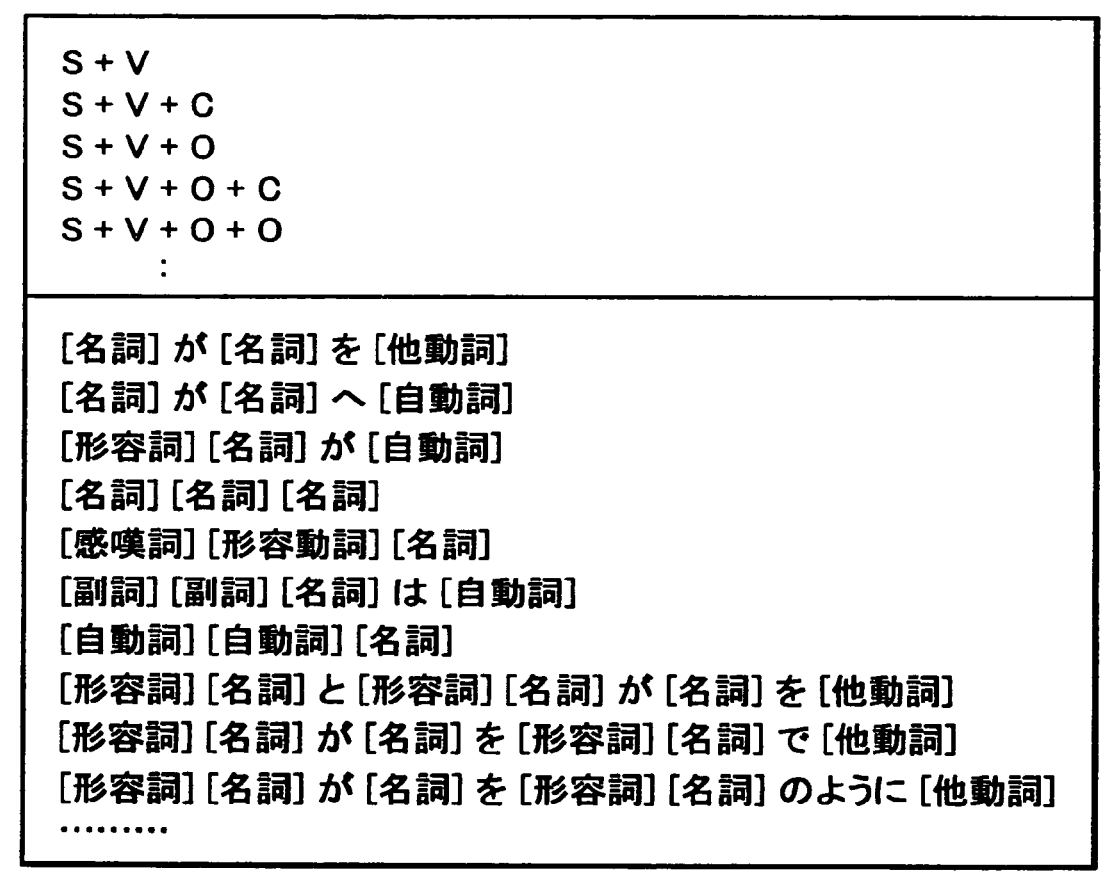

FIG. 14 shows an example of sentence syntax templates. For English sentence syntax templates, the templates are first classified into fundamental sentence syntaxes. Elements of each fundamental syntax include a subject S, a verb V, a complement C, an object O and the like. An adverb, an interjection and the like are used for modifications. For example, the subject S and object O are further classified into a pronoun, an article+a noun, an article+an adjective+a noun" and the like. S, V, O, C and the like are herein called segments.

For example, the second template shown in FIG. 14 is S+V+C. This template is further classified into a plurality of lower level templates such as (pronoun)+(verb)+(noun), (pronoun)+(verb)+(adjective), and (article)+(noun)+(auxiliary verb)+(verb)+(adjective)+(noun).

For Japanese sentence syntax templates, for example as shown in FIG. 14, a plurality of sentence syntax templates are stored, each template being constituted of a combination of a plurality of segments each corresponding to one part of speech. For example, the first sentence syntax template at the uppermost row in FIG. 14, is constituted of three segments including "[noun] が", "[noun] を", and "[transitive verb]".

Referring to FIG. 13, a melody division unit N, a segment number coincidence template search unit O, a syllable number count unit Q for an unsettled part of speech, a sentence syntax template decision unit R, an unsettled part of speech search unit S and an unsettled vocabulary decision unit U are functions obtained when CPU 1 executes the word composing program. Each unit operates as in the following manner.

The melody division unit N divides a selected melody M, takes a correspondence between each divided section and a segment to determine the number of segments of the melody. The melody may be divided automatically in accordance with a predetermined algorithm, or manually by a user. For example, the melody may be divided by setting a note having a long note length to the last of a section, by setting a section partition between notes having a large pitch difference, or by setting a section partition at a position where there is a change in detected chord and tempo.

After the melody is divided, the segment number coincidence template search unit O searches the database L to detect the sentence syntax template whose segment number coincides with the melody.

It is assumed that a melody whose words are to be written has six syllables and that two templates are selected including:

$$S+V+C \quad (1)$$

$$S+V+O \quad (2)$$

A syllable is assigned to each of the segments S, V, O and C. Assuming that S and V are determined and S and V have four syllables in total, then the remaining C or O is required to have two syllables. In this manner, the sentence segment is determined one after another, and the remaining segment is selected so as to coincide with the remaining number of syllables, two syllables. For example, if a lower level template for C or O has (article)+(adjective)+(noun), C or O cannot be realized by two syllables so that this template is discarded from template candidates. Therefore, a template such as (noun), (adjective) and (adjective)+(noun) which can be made of two syllables is searched for C or O. For example, adjectives and nouns having two syllables are searched from a vocabulary database shown in FIG. 15. In this manner, a portion of the sentence is determined and the remaining unsettled sentence is derived from the database to settle it.

A specific example of a Japanese language sentence will be described. It is assumed that a melody whose words are to be written has twenty six syllables and that this melody is divided into six sections, i.e., six segments as indicated by the following formula (1):

$$[5\ syllables]/[3\ syllables]/[4\ syllables]/[5\ syllables]/[4\ syllables]/[5\ syllables] \quad (1)$$

It is then assumed that the following sentence syntax templates (a) to (c) having six segments are selected from the sentence syntax template database L:

[adjective]/[noun]と/[adjective]/[noun]が/
[noun]を/[transitive verb]　(a)

[adjective]/[noun]が/[noun]を/[adjective]/
[noun]で/[transitive verb]　(b)

[adjective]/[noun]が/[noun]を/[adjective]/
[noun]のように/[transitive verb]　(c)

In the templates (a) to (c), "/" indicates a delimiter for a segment, and "[ ]" indicates a part of speech having the arbitrary number of syllables. "と", "が" and the like are a postpositional auxiliary word whose syllable number is counted in.

The syllable number count unit Q for an unsettled part of speech calculates the number of syllables of each part of speech in each segment of each sentence syntax template candidate (a) to (c) in accordance with the melody segment condition of the formula (1), i.e., the number of syllables of each part of speech. For example, in the case of the template (a), the [adjective] of the first segment is five syllables and the [noun] in the second segment is two syllables (three syllables–one syllable) because one syllable "と" is added to the second segment. The [noun] in the fourth segment is four syllables (five syllables–one syllable) because one syllable "が" is added to the fourth segment. Similarly, the number of syllables of each part of speech is calculated for the other templates.

Next, the sentence syntax template decision unit R discards the template not satisfying the syllable number condition from the template candidates. For example, the number of template candidates is reduced by comparing the number of syllables of each part of speech calculated by the syllable number count unit Q for an unsettled part of speech with the number of syllables in each segment of the melody. Namely, the fifth segment of the template (c) has already four syllables of the postpositional auxiliary word of "のように" which is equal to four syllables of the fifth segment of the melody shown in the formula (1). Since the syllable number count unit Q for an unsettled part of speech counts as a zero syllable the number of syllables of the [noun] in the fifth segment of the template (c), this template (c) is discarded. Therefore, the templates (a) and (b) are left. One of the templates (a) and (b) are selected by a user or by using a random number. It is herein assumed that the template (a) is selected.

The vocabulary database T is stored in a hard disk or the like of the external storage device 11 and stores a number of registered sets of a word and a part of speech. The unsettled part of speech search unit S selects from the vocabulary database T a part of speech designated by the selected template and having the syllables equal in number to the calculated number. For example, for the first segment, an adjective having five syllables (refer to the formula (1)) is selected from the vocabulary database T shown in FIG. 15. For example, two words "すばらしい" and "うつくしい" are selected a candidate words. In counting the number of syllables of each word in the vocabulary database T, the syllable number count rules of the second embodiment are applied.

The unsettled vocabulary decision unit U displays the candidate words selected as described above on the display 5, for example, in a search result list box. One word matching the melody is selected from the candidate words and decided as a melody word. This selection/decision is performed by a user or by using a random number similar to the template selection. If there is a database for relevant words, a target word can be selected based upon words before and after the target word.

A function of selecting again "modifier word"+"noun" or "modifier word"+"verb" as one word for an unsettled part of speech of a noun and a verb in the template. For example, if a template is [noun]は[noun]を[transitive verb] and one modifier word is added to the noun and verb, the template is changed to [[adjective][noun]]は[ ]adjective][noun]]を[transitive verb].

For example, if some section (segment) is assigned a [noun], a relatively long noun coincident with the number of syllables may be selected or the [noun] is further divided into [adjective] and [noun] to select the words having the same number of syllables.

The function of reducing the number of candidate parts of speech can be improved further if accents of both English and Japanese words are registered in the vocabulary database, and when a part of speech is searched from the vocabulary database, the characteristics of a melody are judged to select a word having an accent matching the characteristics from the vocabulary database.

If there is melody sections having the same melody role among a plurality of melody sections, the same template is used for such melody sections. In this case, if parts of speech in one melody section have already been selected, the words of these parts of speech are preferentially selected as the words in another melody section having the same role. For example, if a melody has a measure structure of A1-B1-C1-A2-B2-C2, the same template is used for A1 and A2. If the first section (segment) of A1 is determined, candidate words for the first section of A2 are narrowed down to those words related to those selected for A1.

The above embodiments are constituted of a personal computer and software. The above embodiments may be applied to electronic musical instruments. The word composing program may be stored in a ROM. A tone generator, a sequencer, an effector and the like may be discrete devices which are interconnected by communication means such as MIDI and various networks.

The format of melody data may be any format such as an "event+relative time" format which defines an occurrence time of a performance event by a time from one previous event, an "event+absolute time" format which defines an occurrence time of a performance event by an absolute time in music or in a measure, a "pitch (rest)+note length" format which defines performance data by a pitch and length of a note or by a rest and rest length, and a "direct storage" format which reserves a memory area corresponding to each minimum performance resolution and stores each performance event in the memory area corresponding to the occurrence time of a performance event.

In the embodiments, the word composing program is stored beforehand in the hard disk. The invention is not limited thereto, but the word composing program may be recorded in a CD-ROM or CD-R and loaded in a hard disk. CPU 1 develops this word composing program upon RAM 3 and in accordance with the program read from RAM 3, performs the word composing process in a similar manner to the embodiments. In this manner, CPU 1 can perform similar operations to those when the word composing program is stored in ROM 2. With this arrangement, new installation, addition, version-up and the like of the word composing program can be made easily. The word composing program may be recorded in a floppy disk, a magneto optical (MO) or the like and supplied to RAM 3 or a hard disk.

The word composing program may be downloaded by using the communication interface 13. In this case, for example, the communication interface 13 is used for the connection to the communication network 16 such as a local area network (LAN), the Internet and a telephone line. The word composing program is distributed from the server computer 17 via the communication network and recorded in a hard disk to complete the download.

A MIDI interface is not limited only to a dedicated MIDI interface, but it may be configured by using a general interface such as RS-232C, a universal serial interface (SUB), IEEE1394. In this case, data different from MIDI messages may be transmitted and received at the same time.

The present invention has been described in connection with the preferred embodiments. The invention is not limited only to the above embodiments. It is apparent that various modifications, improvements, combinations, and the like can be made by those skilled in the art.

I claim:

1. A word composing apparatus comprising:
   a dictionary storing at least words and parts of speech corresponding to the words;
   a search condition designator that designates a part of speech from a plurality of parts of speech as a search condition, said parts of speech including at least a class of nouns and verbs;
   a word search unit that searches for one or more words matching the search condition designated by said search condition designator from said dictionary;
   a display unit that displays one or more words that match the search condition; and
   an input processor that selects one of the one or more words displayed that match the search condition and executes a process of inputting the selected word displayed on said display unit as letters or characters of a song word.

2. A word composing apparatus, comprising:
   a dictionary storing at least words and parts of speech corresponding to the words;
   a search condition designator that designates at least the number of syllables and a part of speech as a search condition;
   a word search unit that searches a word matching the search condition designated by said search condition designator from said dictionary;
   a display unit that displays a searched word; and
   input processor that executes a process of inputting a word displayed on said display unit as letters or characters of a song.

3. A word composing apparatus, comprising:
   a dictionary storing at least words and parts of speech corresponding to the words;
   a search condition designator that designates at least part of speech as a search condition;
   a word search unit that searches a word matching the search condition designated by said search condition designator from said dictionary;
   a display unit that displays a searched word; and
   input processor that executes a process of inputting a word displayed on said display unit as letters or characters of a song,
   wherein said search condition designator counts a letter or character train containing predetermined letters or characters as both one syllable and two syllables, as a method of counting the number of syllables of a word in said dictionary.

4. A word composing apparatus comprising:
   a sentence syntax storing device storing a plurality of sentence syntax templates each defining an order of a plurality of parts of speech, said parts of speech including at least the class of nouns and verbs;
   a display unit that displays a plurality of sentence syntax templates, based on the stored sentence syntax templates, to urge selection of one sentence syntax template;
   a designator that designates one sentence syntax template among sentence syntax templates displayed on said display unit; and
   an input processor that inputs words of a song in accordance with the designated sentence syntax template.

5. A word composing apparatus according to claim 4, further comprising an input processor that inputs words in accordance with the selected sentence syntax template.

6. A word composing apparatus, according to claim 5, wherein said input processor inputs words of a song one by one from a plurality of candidate words in accordance with the selected sentence syntax template.

7. A word composing apparatus, according to claim 6, wherein said plurality of candidate words are detected in accordance with the selected sentence syntax template.

8. A word composing method executed on an apparatus having a display, said method comprising the steps of:
   storing at least words and parts of speech corresponding to words in a dictionary;
   designating a part of speech from a plurality of parts of speech as a search condition, said parts of speech including at least the class of nouns and verbs;
   searching for one or more words matching the search condition from the dictionary;
   displaying one or more words that match the search condition on the display;

selecting one or more words displayed that match the search condition; and adopting the selected word as part of a song word to be input.

9. A word composing method executed on an apparatus having a display, said method comprising the steps of:
- storing a plurality of sentence syntax templates, each sentence syntax template defining an order of a plurality of parts of speech, said parts of speech including at least a class of nouns and verbs;
- displaying a plurality of sentence syntax templates on the display to urge selection of one sentence syntax templates
- selecting a sentence syntax template from a plurality of sentence syntax templates each defining a typical order of a plurality of parts of speech; and
- inputting words of a song in accordance with the selected sentence syntax template.

10. A word composing method according to claim 9, wherein said step of inputting words inputs words of a song one by one from a plurality of candidate words in accordance with the selected sentence syntax template.

11. A word composing method according to claim 10, wherein said plurality of candidate words are detected in accordance with the selected sentence syntax template.

12. A computer readable medium having a word composing program for making a computer execute:
- a process of storing at least words and parts of speech corresponding to words in a dictionary;
- a process of designating a part of speech from a plurality of parts of speech as a search condition, said parts of speech including at least a class of nouns and verbs;
- a process of searching one or more words matching the search condition from the dictionary; and
- a process of adopting the selected word as part of a song word to be input.

* * * * *